(12) United States Patent
Holte et al.

(10) Patent No.: US 12,264,991 B2
(45) Date of Patent: Apr. 1, 2025

(54) APPARATUS, SYSTEM AND METHOD FOR MAINTENANCE OF A STRUCTURE CARRYING A FLUID

(71) Applicant: Prosence AS, Mandal (NO)

(72) Inventors: Frode Holte, Mandal (NO); Karsten Lien, Mandal (NO); Amund Breland, Lindesnes (NO)

(73) Assignee: Prosence AS, Mandal (NO)

( * ) Notice: Subject to any disclaimer, the term of this patent is extended or adjusted under 35 U.S.C. 154(b) by 264 days.

(21) Appl. No.: 17/617,079

(22) PCT Filed: Jun. 11, 2020

(86) PCT No.: PCT/NO2020/050155
§ 371 (c)(1),
(2) Date: Dec. 7, 2021

(87) PCT Pub. No.: WO2020/251370
PCT Pub. Date: Dec. 17, 2020

(65) Prior Publication Data
US 2022/0236134 A1    Jul. 28, 2022

(30) Foreign Application Priority Data
Jun. 12, 2019   (NO) .................................. 20190720

(51) Int. Cl.
*G01M 3/18*   (2006.01)
(52) U.S. Cl.
CPC ..................................... *G01M 3/18* (2013.01)
(58) Field of Classification Search
None
See application file for complete search history.

(56) References Cited

U.S. PATENT DOCUMENTS

| 4,206,402 A | | 6/1980 | Ishido |
| 4,335,627 A | * | 6/1982 | Maxwell ................. F16F 15/31 |
| | | | 416/169 R |

(Continued)

FOREIGN PATENT DOCUMENTS

| CN | 102435399 | 5/2012 |
| CN | 104324917 | 2/2015 |

(Continued)

OTHER PUBLICATIONS

Norwegian Search Report for No. 20190720, dated Jan. 6, 2020.
International Search Report for PCT/NO2020/050155, dated Sep. 9, 2020.

*Primary Examiner* — John F Mortell
(74) *Attorney, Agent, or Firm* — Andrus Intellectual Property Law, LLP

(57) ABSTRACT

A method and apparatus are for maintaining a structure for carrying a fluid. In addition, a method, apparatus and system are for detecting leakage from a structure carrying a fluid. The methods include: providing a jacket covering at least a portion of a structure carrying a fluid, the jacket forming a pocket between the jacket and the structure, the pocket having an inlet and an outlet; injecting a drive fluid into the pocket in a flow through the inlet; and moving a potentially harmful fluid in the pocket with the flow of injected drive fluid out of the pocket through the outlet. The method may further include detecting the potentially harmful fluid by use of a detector downstream of the pocket. The described apparatuses and/or the system may be for performing one or more of the methods.

21 Claims, 2 Drawing Sheets

(56) References Cited

U.S. PATENT DOCUMENTS

| | | | |
|---|---|---|---|
| 4,981,652 A | 1/1991 | Ratfisch | |
| 5,343,191 A | 8/1994 | McAtamney | |
| 5,594,162 A | 1/1997 | Dolan et al. | |
| 8,234,911 B2 | 8/2012 | Jax | |
| 10,161,557 B2 * | 12/2018 | Baret | F16L 59/141 |
| 2003/0037596 A1 | 2/2003 | Sorensen | |
| 2007/0101803 A1 | 5/2007 | Tujii et al. | |
| 2008/0294096 A1 * | 11/2008 | Uber, III | A61M 31/005 |
| | | | 604/66 |
| 2010/0126250 A1 * | 5/2010 | Jax | G01M 3/222 |
| | | | 73/40.5 R |
| 2011/0219855 A1 | 9/2011 | Lucente et al. | |
| 2015/0068288 A1 | 3/2015 | Gaudet et al. | |
| 2015/0112269 A1 * | 4/2015 | Sumida | A61M 5/425 |
| | | | 604/173 |

FOREIGN PATENT DOCUMENTS

| | | |
|---|---|---|
| DE | 3305005 | 8/1984 |
| GB | 2521239 | 6/2015 |
| GB | 201410625 | 6/2017 |
| JP | S 58-20913 | 5/1983 |
| JP | 2001059794 | 3/2001 |
| JP | 2003-114163 | 4/2003 |
| JP | 2007-71862 | 3/2007 |
| JP | 2016-105069 | 6/2016 |
| WO | 85/00417 | 1/1985 |

\* cited by examiner

APPARATUS, SYSTEM AND METHOD FOR MAINTENANCE OF A STRUCTURE CARRYING A FLUID

CROSS-REFERENCE TO RELATED APPLICATIONS

This application is the U.S. national stage application of International Application PCT/NO2020/050155, filed Jun. 11, 2020, which international application was published on Dec. 17, 2020, as International Publication WO 2020/251370 in the English language. The International Application claims priority of Norwegian Patent Application No. 20190720, filed Jun. 12, 2019. The international application and Norwegian application are both incorporated herein by reference, in entirety.

FIELD

In one aspect, the present invention relates to preservation of a structure carrying a fluid, e.g. a pipe, a container or a chamber. In another aspect, the present invention relates to detection of a leaked fluid from the structure.

BACKGROUND

Structures for carrying fluids, such as e.g. pipes or containers for carrying oil or gas or water, are widely used, e.g. in industrial facilities, in commercial buildings and in residential buildings. The structures may be susceptible to damage from e.g. corrosion. Such damage, or simply the risk of such damage, may necessitate a rigid and expensive maintenance program, or cause minor or even major accidents.

Transportation of fluids and storing of fluids may be hazardous, particularly if said fluids are flammable, explosive, poisonous or otherwise potentially harmful.

One example of hazardous transportation of fluids, is transportation through pipelines on facilities for hydrocarbon extraction, such as offshore rigs, where produced hydrocarbon fluids are typically moved through pipelines at high pressures and high flow rates from a source of production to a process system. On such rigs, a leakage of hydrocarbon gas from a pipeline can potentially lead to a major accident that may have disastrous consequences.

Other examples include residential buildings where hydrocarbon gas may be distributed via pipelines to be used e.g. for heating purposes. Accidental leaks of gas in residential buildings may lead to fires or explosions causing loss of human life and destruction of property.

It is known from prior art that leakages can be detected, e.g. by use of infrared point sensors, ultrasonic sensors, or electrochemical gas sensors.

Some structures for carrying fluids, particularly structures carrying potentially hazardous fluids such as hydrocarbons, may be covered by a layer of insulation. A pocket may be formed between a structure and an insulation jacket in which a corrosive fluid may become trapped. A corrosive fluid caught in a pocket between an insulation jacket and e.g. a pipe carrying a hazardous fluid may be particularly problematic as it may be hard to detect the problematic fluid caught under the cover of the insulation jacket, as it may be more demanding to clear the problematic fluid from the pocket, and because the risk involved is greater when the fluid carried is hazardous as a leak could cause a major accident. The above-mentioned methods of detecting a leakage from prior art may not be effective for leaked fluids trapped under the cover of an insulation jacket.

A more advanced system for leakage detection is known from US 20030037596 A1, wherein a carrier pipe is surrounded by a tubular outer jacket, creating an annular space between the outer jacket and the carrier pipe. A sniffer pipe is situated in the annular space generally parallel to the carrier pipe, the sniffer having a plurality of holes extending radially through its walls and axially spaced from each other. A suction device is coupled to one end of the sniffer pipe, with the other end being closed. Any gas leaked from the carrier pipe is sucked in through the apertures of the sniffer pipe and through the sniffer pipe to a gas detector which can then detect the leaked gas.

The invention provides an advantageous alternative to the prior art.

SUMMARY

In a first aspect, the invention relates to a method of maintaining a structure for carrying a fluid, the method comprising the steps of:
  providing a jacket covering at least a portion of the structure, the jacket forming a pocket between the jacket and the structure, the pocket having an inlet and an outlet;
  injecting a drive fluid into the pocket in a flow through the inlet; and
  moving a potentially harmful fluid in the pocket with the flow of injected drive fluid out of the pocket through the outlet.

In a second aspect, the invention relates to an apparatus for maintaining a structure for carrying a fluid, the apparatus comprising:
  a jacket for covering at least a portion of the structure and forming a pocket having an inlet and an outlet between the jacket and the structure;
  a fluid source for providing a drive fluid for injection into the pocket for driving a potentially harmful fluid in the pocket out of the pocket through the outlet; and
  a first tube for connecting the fluid source to the inlet for providing a path for the drive fluid to the pocket.

The potentially harmful fluid may be a corrosive fluid that, if left in the pocket would or at least could damage the structure over time. The potentially harmful fluid may be a fluid that has leaked from the structure, or a fluid that has found its way into the pocket from another source than the structure, or a fluid that has come from condensation. The potentially harmful fluid may be a hazardous fluid, such as e.g. a poisonous fluid, an acidic fluid, a potentially explosive fluid, a flammable fluid, or another type of hazardous fluid, that if left in the pocket could cause or be involved in a minor or a major accident. The potentially harmful fluid may be a liquid or a gas. The potentially harmful fluid may comprise a mixture of different molecules. The potentially harmful fluid may comprise e.g. $O_2$, $H_2O$, $H_2S$ and/or CO and/or any other gas or liquid that may be potentially harmful for a structure.

Note that "carrying" a fluid may include e.g. storing, holding, transporting, communicating and conveying said fluid. The structure may be e.g. a pipe or a separator or a container for gas. Note that "pipe" may refer to a section or portion of a pipeline. In some embodiments in this context, "pipe" refers to a section or portion of a pipeline comprising a flange and/or a valve or another point, a portion or section of a pipeline being relatively susceptible to a leak.

The method according to the first aspect may comprise a step of: detecting the potentially harmful fluid by use of a detection means placed downstream of the outlet.

The apparatus according to the second aspect of the invention may comprise: a detection means for detecting the potentially harmful fluid. The detection means may be placed downstream of the outlet. The tube for connecting the fluid source to the inlet may be a first tube. The apparatus may further comprise a second tube. The second tube may be connected to the outlet of the pocket for leading the potentially harmful fluid from the outlet. The detection means may be placed in fluid communication with the outlet, e.g. in the second tube.

There is further described: a method of detecting a leakage; an apparatus for detecting a leakage; and a system for detecting a leakage.

In a third aspect, the invention relates to a method of detecting a leakage, the method comprising the steps of:
 providing a jacket covering at least a portion of a structure carrying a fluid, the jacket forming a pocket between the jacket and the structure, the pocket having an inlet and an outlet;
 injecting a drive fluid into the pocket in a flow through the inlet;
 moving a leaked fluid in the pocket with the flow of injected drive fluid out of the pocket through the outlet; and
 detecting the leaked fluid by use of a detection means downstream of the outlet.

The injected fluid may be referred to as a "drive fluid", as it may be used to move/drive the leaked fluid from the pocket. The leaked fluid may be the/a potentially harmful fluid.

In a fourth aspect, the invention relates to an apparatus for detecting a leakage, wherein the apparatus comprises:
 a jacket for covering at least a portion of a structure carrying a fluid, forming a pocket between the structure and the jacket and providing an inlet into the pocket and an outlet from the pocket;
 a fluid source for injecting a drive fluid into the pocket;
 a first tube connecting the fluid source to the inlet of the pocket for leading the drive fluid into the pocket;
 a second tube connected to the outlet of the pocket for leading the leaked fluid and the drive fluid out of the pocket; and
 a detection means for detecting the leaked fluid, the detection means being placed downstream of the pocket, in fluid communication with the pocket via the second tube and configured for detecting the leaked fluid,
the apparatus being configured for providing a flow of drive fluid from the fluid source through the pocket for driving a leaked fluid from the pocket to the detection means for the detection means to detect the leaked fluid.

In the following, references made to the apparatus may refer to the apparatus according to the second aspect of the invention or the apparatus according to the fourth aspect of the invention. In the following, references made to the method may refer to the method according to the first aspect of the invention or the method according to the third aspect of the invention.

The apparatus may comprise a fluid source for supplying the drive fluid and a first tube for connecting the fluid source to the inlet of the pocket. Furthermore, the apparatus may comprise a second tube connected to the outlet of the pocket for evacuating the fluid or fluids from the pocket. The apparatus may comprise the detection means placed downstream of the outlet. Said detection means may be part of or connected to the second tube, for detecting a fluid being evacuated from the pocket.

The method may comprise the step of providing the apparatus according to the second aspect of the invention or the apparatus according to the fourth aspect of the invention.

In a fifth aspect, the invention relates to a detection system for detecting a leakage of fluid from one of a plurality of structures, the system comprising:
 a plurality of jackets each covering at least a portion of a structure, forming a pocket between the structure and the jacket and providing an inlet into the pocket and an outlet from the pocket;
 a fluid source for injecting a drive fluid into each of the pockets;
 a plurality of first tubes connecting the fluid source to the inlet of each of the pockets for leading the drive fluid into each of the pockets;
 a plurality of second tubes for leading the leaked fluid and the drive fluid out of the plurality of pockets; and
 a number of detection means for detecting a leakage, the number of detection means being in fluid communication with the plurality of pockets via the plurality of second tubes and configured for detecting the leaked fluid,
the system being configured for providing a flow of drive fluid from the fluid source through each of the pockets for driving a leaked fluid from any one of the pockets to at least one of the number of detection means for the detection means to detect the leaked fluid.

There are several advantages of the invention. By injecting a drive fluid into the pocket, it is possible to affect/control the environment in the pocket. The apparatus may include means for e.g. ensuring cleanness and dryness of the drive fluid, which may have positive effects on e.g. valves and/or sensors that may come into contact with the drive fluid. The apparatus according to the second aspect, and/or the fourth aspect, and/or the system according to the fifth aspect may further comprise means for e.g. controlling a temperature of the drive fluid and through use of said means for controlling the temperature affect the temperature in and/or, in some embodiments, around the pocket.

The jacket covering at least a portion of the structure may typically cover at least a portion of an outer surface of the structure. The jacket may circumferentially cover a structure or cover a structure substantially in its entirety, or just cover a minor portion of a structure, e.g. a portion that is particularly prone to leakages.

If a situation should arise wherein the structure would leak, the invention may provide a means to contain, control and/or evacuate and/or detect the potentially harmful/leaked fluid. Depending on the proximity of the detection means, the size of the pocket and the rate of the flow of the drive fluid, the leak may be detected very quickly. The drive fluid may drive a potentially harmful/leaked fluid from the pocket, thereby advantageously keeping the potentially harmful/leaked fluid from establishing a significant volume of highly concentrated potentially harmful/leaked fluid. The potentially harmful/leaked fluid may mix with the drive fluid, and the resulting mix of potentially harmful/leaked fluid and drive fluid may be less hazardous/harmful than a concentrated volume of the potentially harmful/leaked fluid.

The jacket may comprise a gastight material. The jacket may be gastight. The jacket may, when installed such that it covers at least a portion of a structure, be gastight, be configured to not provide any escape route for a fluid apart from the outlet and/or inlet. This may be highly advantageous for purposes related to containment of a potentially harmful/leaked fluid and/or for precise detection of the potentially harmful/leaked fluid.

The jacket may comprise a material that provides thermal protection and/or insulation. Structures used for carrying hazardous fluids may often require thermal protection. Thermal protection may be necessary either to protect the fluid inside a structure from external factors, such as heat, e.g. in the event of a fire near the structure, or cold, e.g. to keep a fluid inside the structure from freezing, or to protect e.g. people from a very hot or very cold structure if the fluid inside the structure is very hot or very cold.

The drive fluid may e.g. be a temperate fluid or a relatively hot fluid, e.g. a fluid of a temperature over 25 degrees Celsius, over 30 degrees Celsius, over 35 degrees Celsius or over 50 degrees Celsius, or over 100 degrees Celsius. The relatively hot fluid may e.g. comprise relatively hot air from a compressor. The hot air may be used to heat up the structure, the air around the structure and/or a fluid inside the structure. In some embodiments, the drive fluid may be colder, e.g. of a temperature below 25 degrees Celsius, e.g. 20 degrees Celsius, 10 degrees Celsius, 0 degrees Celsius, or slightly or significantly lower than 0 degrees Celsius such as e.g. minus 10 degrees Celsius or −100 degrees Celsius.

The jacket may further or alternatively comprise other protective materials, e.g. to make the jacket able to withstand an explosion without being damaged.

The jacket may be made from e.g. a rubber material, or it may be made from a metal material, e.g. steel. The jacket may be e.g. a steel box.

The jacket may comprise a form of Velcro that may be used to fasten the jacket around the structure.

The apparatus may comprise a pressure sensor arranged in connection with the first tube for monitoring a fluid pressure in the first tube and/or a pressure sensor arranged in connection with the second tube for monitoring a fluid pressure in the second tube. This may be advantageous to provide information regarding the integrity of the apparatus, e.g. to tell if there is a leak in the apparatus or to tell if there is a leak from the structure.

If the apparatus has both a first pressure sensor arranged in connection with the first tube and a second pressure sensor arranged in connection with the second tube, a higher pressure detected by the second pressure sensor than by the first pressure sensor may indicate a leak from the structure, whereas a lower pressure detected by the second pressure sensor than by the first pressure sensor may indicate a leak of fluid from the apparatus somewhere between the two pressure sensors.

The apparatus may comprise a liquid-detection device for detecting a presence of a liquid in the pocket. The fluid in the structure may comprise a liquid. If the fluid leaks from the structure into the pocket, at least a portion of the liquid may not be carried by the drive fluid from the pocket and may then assemble in a bottom portion of the pocket in the jacket. In such a situation, a liquid-detection device placed in the pocket may advantageously detect the liquid.

Furthermore, the apparatus may comprise a pressure reduction valve, for reducing the pressure in a tube. The main pressure reduction valve may reduce system pressure, e.g. if a failure occurs in the fluid source, such as a compressor system, connected to the apparatus and/or forming part of the apparatus, for protecting the apparatus against a destructive high pressure drive fluid.

The apparatus may comprise a flow adjustment valve. The flow adjustment valve may advantageously be useful for adjusting an amount of drive fluid being injected into one or more pockets of the apparatus.

The apparatus may comprise a pressure switch. The pressure switch may e.g. be used to send a signal in case of a sudden, unplanned drop of fluid pressure, e.g. during a shutdown during a power shortage or outage causing one or more fluid sources to stop delivering fluid at a sufficient pressure.

Some embodiments of the apparatus may comprise a filter for the drive fluid for achieving cleanness and/or dryness of the drive fluid to be injected into the pocket. It may be beneficial with a clean and dry fluid to ensure e.g. that valves and sensors being affected by the fluid performs sufficiently.

Furthermore, the apparatus may comprise a flow measurement device and/or a flow adjustment valve. The flow measurement device may provide an alert if the flow rate is not within an appropriate interval. By measuring the flow rate, it may e.g. be possible to detect a leakage into the pocket by detecting an increased flow rate or a leakage from the pocket by detecting a decreased flow rate. The flow adjustment valve may be used e.g. after installation to set a correct flow rate into a pocket or into a plurality of pockets.

The apparatus may comprise a processor, which may be connected to one or more detectors and/or other parts of the apparatus. The detectors may be configured to send a signal to the processor in the event of a detection of a leak. The apparatus may further comprise an alarm, being connected to the processor or to one or more detectors, for providing e.g. an alarm signal in the event of a detected leak.

The apparatus may be connected to a closing means and configured to operate said closing means to stop a flow of fluid to or through the structure in the event of a detected leak.

The system may comprise the apparatus. The system may comprise a plurality of apparatuses for detecting a leakage, or at least a plurality of some of the parts of the apparatus in combination with a smaller amount of other parts of the apparatus. The system may e.g. comprise a plurality of jackets, e.g. 4, 8 or 13 jackets, each covering at least a portion of a structure, one or more gas detectors for each of the plurality of jackets, one first tube and one second tube for each of the plurality of jackets, but a smaller amount of fluid sources for providing drive fluid, e.g. one, two or three fluid sources.

The system may comprise a plurality of fluid sources, each for injecting drive fluid into one or more pockets formed by one or more jackets.

The system may advantageously comprise a plurality of detection means. In a particularly advantageous system, the system may comprise at least one detection means for every pocket which is connected to one pocket or a group of pockets only, thereby enabling precise detection of where a leak is occurring. In some embodiments, the system may comprise one detection means for a group of pockets, the detection means being configured to detect if there is a leak in one of the pockets in the group of pockets.

In other embodiments, the system may comprise only one detector. If the system comprises only one detector, the following steps may be included in the method for detecting a leakage to identify in which one of a plurality of pockets the leakage occurred:
  stopping the injection of drive fluid into the plurality of pockets by closing a number of valves;
  in turn, for each of the pockets, for one pocket at a time, opening a valve to inject drive fluid into the pocket;
  using the detector to detect whether there is a leakage of leaked fluid into the pocket;

when detecting a leaked fluid by use of the detector, identifying from which one pocket the detector receives fluid.

A similar method may be used in embodiments where the system comprises more than one detector, but where a plurality of pockets is connected to each detector. The method may then comprise the steps of:
stopping the injection of drive fluid into the plurality of pockets connected to a detector that has detected a leakage by closing a number of valves;
in turn, for each of the pockets connected to the detector, for one pocket at a time, opening a valve to inject drive fluid into the pocket;
using the detector to detect whether there is a leakage of leaked fluid into the pocket;
when detecting a leaked fluid by use of the detector, identifying from which one pocket the detector receives fluid.

Embodiments having one detector or a low number of detectors relative to the number of pockets may be advantageous as there may be savings e.g. in time and complexity for installation of the system and cost of equipment. A "low number of detectors" in this regard means the number of detectors is lower than the number of pockets. There may e.g. be one detector for every five pockets, every ten pockets, every fifteen pockets, every twenty-five pockets or every fifty pockets.

The system may comprise a control unit e.g. for controlling the closing and opening of the valves, for identifying which one or more valves are open to thereby identify which one or more pockets are open are receiving drive fluid and are communicating fluid to the detector, for communicating between the valves and the detector, for presenting information to an operator of the system, for sending alarm signals to an alarm system, etc. The control unit may comprise the processor. The control unit may further comprise e.g. means to operate the processor, to communicate with the processor, to operate the processor, and/or to display information from the processor.

One or more pockets in the system may comprise a liquid detection means for detecting liquid in the pocket or pockets.

The system may comprise a plurality of pressure sensors, e.g. at least one connected to each first tube and each second tube, to detect fluid pressure in the first tubes and second tubes. These pressure sensors may provide information regarding whether or not there is a leak into the pocket and/or from the pocket.

The drive fluid may be supplied to the pocket via a first tube, from a fluid source. The drive fluid may e.g. be air or any other type of fluid suitable for the purpose. A skilled person will know that many fluids may be possible alternatives.

The fluid source may comprise a compressor for pressurising a fluid. The fluid source may further comprise a tank for storing pressurised fluid from the compressor. Storing a pressurised fluid may be advantageous, as the stored fluid may be injected as the drive fluid even during a power failure to evacuate a leaked fluid should a leakage occur during the power failure.

The method according to the first aspect of the invention may comprise the step of providing the apparatus according to the second or the fourth aspect of the invention and/or the system according to the fifth aspect of the invention. The method according to the third aspect of the invention may comprise the step of providing the apparatus according to the fourth aspect of the invention or the fifth aspect of the invention.

The method may comprise the step of injecting a drive fluid into a plurality of pockets. The method may comprise the step of detecting a potentially harmful/leaked fluid from one or more of a plurality of pockets, by use of one or more detectors.

The method may comprise the step of detecting a leaked liquid by use of a liquid-detecting device of the apparatus. The method may further comprise the step of detecting a leakage by monitoring a pressure upstream of the pocket and downstream of the pocket and by comparing said monitored pressures.

The method may comprise the step of sending a signal in the event of a detected leakage. The signal may be a signal from a detector to a processor of the apparatus and/or from a detector or a processor to an alarm device, and/or from a detector or a processor to a closing device for closing a flow of fluid to or through the structure. The signal may be an alarm signal sent from an alarm device, to notify one or more people about the leakage.

The method may further comprise the step of switching off or lowering the pressure of the supply of drive fluid. The step of switching off or lowering the pressure may be an automatic or manual step as a response to e.g. a detected leakage, to a monitored pressure of the drive fluid by a pressure sensor being too high, or a pressure switch reacting to a pressure of the drive fluid.

Note that any of the features mentioned as possible features of the apparatus may also be features of the system, and vice versa. Use of such features to achieve a possible effect of using the feature may be part of the method. E.g. the method may comprise the step of using the fluid filter to increase the dryness and/or the cleanness of the fluid, and/or the method may comprise the step of using the liquid detection means to detect the presence of a liquid in the pocket, and/or the method may comprise the step of using a flow adjustment valve to adjust the flow of drive fluid into a pocket.

The described apparatuses and/or the system may be apparatuses/a system for performing one or more of the methods.

BRIEF DESCRIPTION OF THE DRAWINGS

In the following is described an example of a preferred embodiment illustrated in the accompanying drawings, wherein.

DETAILED DESCRIPTION OF THE DRAWINGS

Note that the drawings illustrates examples of the system according to the fifth aspect and the apparatus according to the second aspect of the invention. The drawings are schematic representations of the inventions, meant only to illustrate some features of the inventions.

Figure 1:
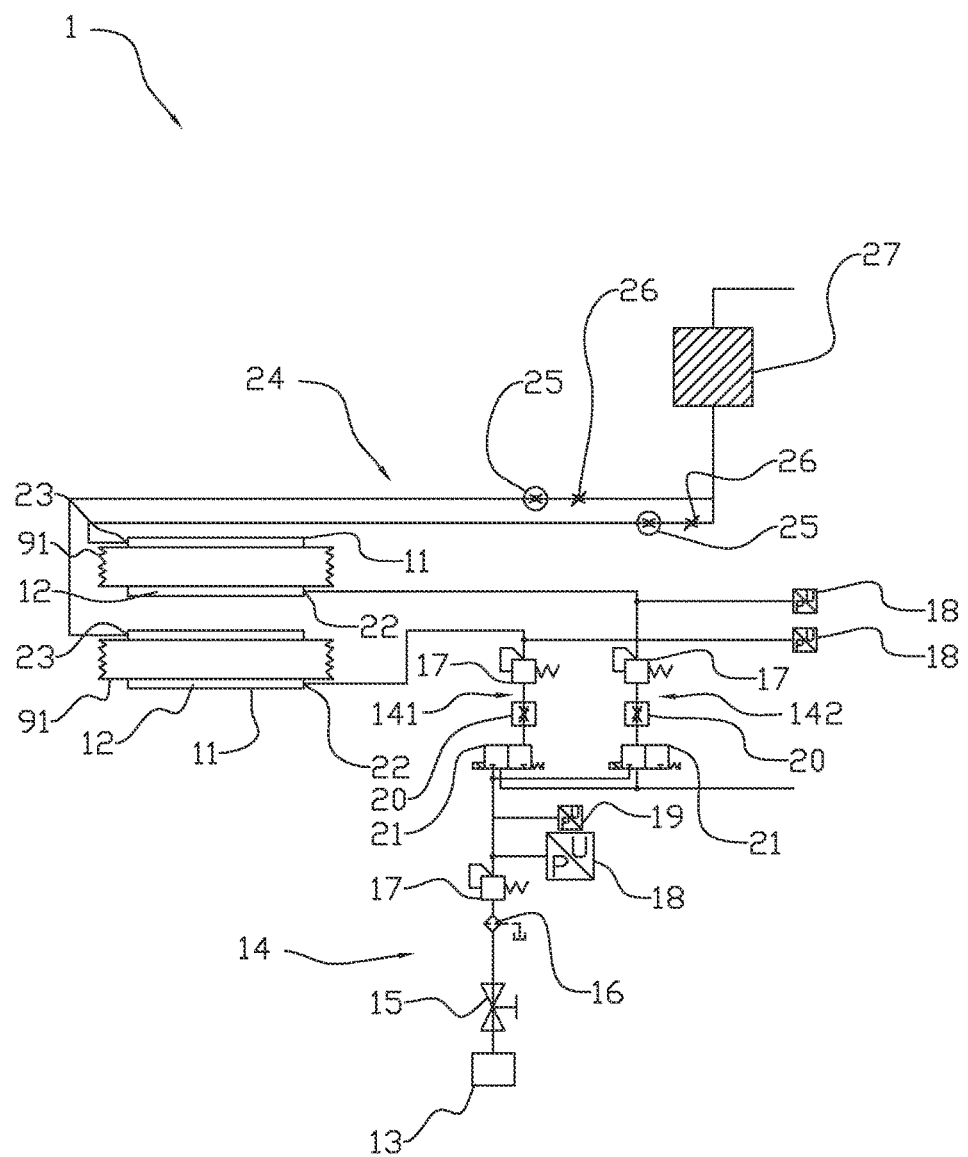
FIG. 1 schematically illustrates an embodiment of the system according to the fifth aspect of the invention.

FIG. 1 shows a system 1 for detection of a leakage from a structure 91, shown in this embodiment comprising two pipes 91. The system 1 is shown comprising two jackets 11 each circumferentially covering a part of one of the pipes 91, thereby forming two pockets 12. A fluid source 13 is connected to the pockets 12 through a first tube 14 having two branches 141, 142. The fluid source 13 in this embodiment of the invention is an air supply 13 for supplying a stream of air into and through the pockets 12.

The first tube 14 is here shown having an isolation valve 15 for opening or closing a flow path for the air supply 13 through the first tube 14. The first tube 14 in this embodiment also includes an air filter with a drain 16 and a pressure reduction valve 17 for regulating the pressure of the air from the air supply 13.

Furthermore, the first tube 14 is here shown having a pressure switch 18 for shutting off the air supply 13 if the pressure of the air in the first tube 14 reaches a certain threshold. In this embodiment, the first tube further includes a pressure transmitter 19 for monitoring the pressure in the first tube 14.

As mentioned, the first tube 14 in the shown embodiment branches into two branches 141, 142, each leading to one of the two pockets 12. Each branch 141, 142 comprises a pressure reduction valve 17, an analogue pressure transmitter 18 and a flow adjustment valve 20. Each branch 141, 142 also has a pneumatic valve 21 to enable switching between supplying air to a pocket 12 or to evacuating air to an outlet to exhaust, e.g. in case of maintenance.

The jackets 11 in the embodiment shown are made from gas-tight material and are applied to the pipes 91 so that the pockets 12 formed between the jackets 11 and the pipes 91 are gas-tight. The system 1 is configured to inject air into an inlet 22 of each pocket and for having gas, including said injected air, evacuate through an outlet 23 of each pocket.

The injected gas is an example of what has been called a "drive fluid" above. Other embodiments of the invention may use other fluids as drive fluids.

A leak of fluid from one of the two pipes 91 circumferentially covered by one of the two jackets 11 will be contained by the system 1. The leaked fluid will leak into a pocket 12 from which it will not be able to escape but through the outlet 23. The leaked fluid, due to a stream air from the air supply 13, will not be allowed to accumulate to create a big, concentrated cloud of gas, but will instead be evacuated through the outlet 23.

The system 1 further has a second tube 24 through which the leaked fluid and the air is evacuated. The second tube 24 includes a flow measurement device 25 and a flow adjustment valve 26, and a multi gas detector 27, and leads to an exhaust to safe zone.

The multi gas detector 27 enables detection of a presence of leaked fluid in the second tube 24. It is now shown in FIG. 1, but the gas detector 27 may be connected to a control unit and/or directly to an alarm device to facilitate for notification of detection. The gas detector may further, either directly or e.g. via a control unit, be connected to a valve or another means for stopping a flow of fluid in the pipe 91. The invention may enable substantially immediate detection of leakage, notification of leakage and/or a shut down of fluid flow through the pipe 91 that is leaking.

Figure 2:
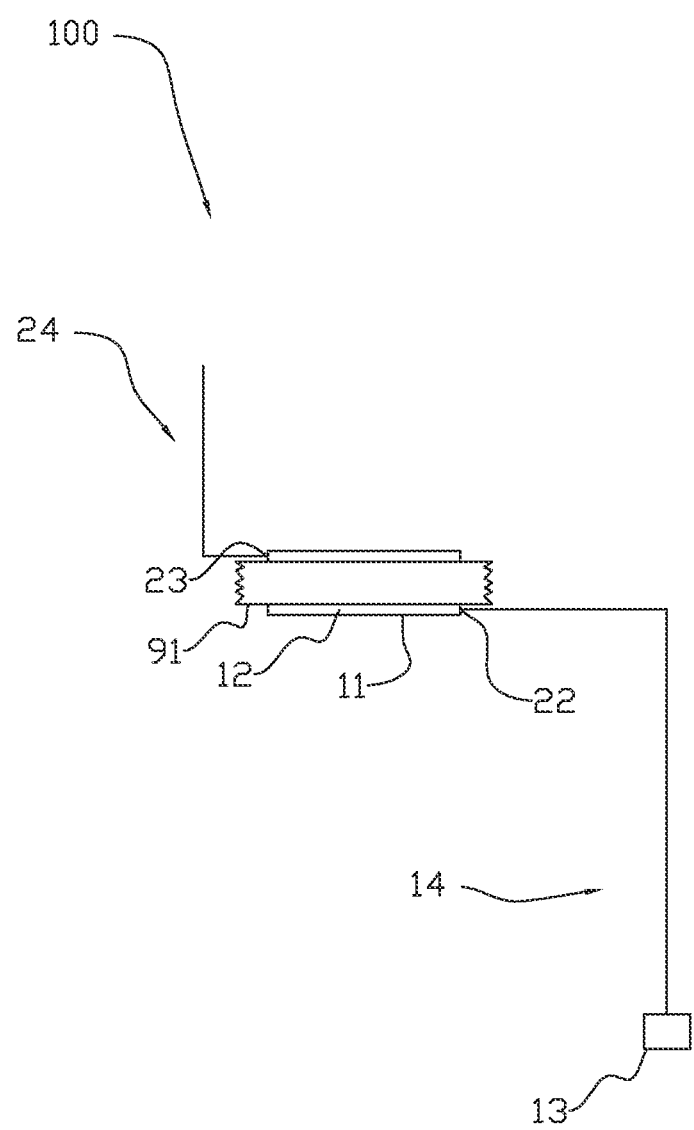
FIG. 2 schematically illustrates an embodiment of an apparatus according to the second aspect of the invention.

FIG. 2 shows a simple embodiment of the apparatus 100 according to second aspect of the invention. The apparatus 100 comprises a jacket 11 arranged around a portion of a pipe 91 and forming a pocket 12 between the jacket 11 and the pipe 91. The pocket 12 has an inlet 22 from which to have drive fluid injected into the pocket 12, and an outlet 23 through which a potential harmful fluid may escape from the pocket 12 with the drive fluid or be driven from the pocket 12 with the drive fluid. The apparatus 100 further comprises a fluid source 13 from which the drive fluid is provided, and a second tube 24 to lead the fluid or fluids escaping or being driven from the pocket 12 away from the pocket 12.

The apparatus 100 according to the second aspect of the invention may, in other embodiments, have any one or more of the features of the system 1, such as, but not limited to, e.g. the pressure reduction valve 17, the analogue pressure transmitter 18, the isolation valve 15, and/or the flow adjustment valve 26, and/or the multi gas detector 27.

The apparatus 100 may be very beneficial to maintain a structure 91 for carrying a fluid, by removing a potentially harmful fluid that if left in the pocket 12 could have caused the structure 91 e.g. to corrode or increased a risk for or caused an explosion that could have damaged or destroyed the structure 91. The apparatus 100 could also be used to remove or reduce a concentration of a fluid that could be hazardous e.g. for personnel, such as a poisonous fluid. With the addition of a detection means to detect a fluid being evacuated/driven from the pocket 12, the apparatus 100 could be an apparatus 100 akin to the apparatus according to the fourth aspect of the invention, capable of detecting a potentially harmful fluid from the structure 91.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. Use of the verb "comprise" and its conjugations does not exclude the presence of elements or steps other than those stated in a claim. The article "a" or "an" preceding an element does not exclude the presence of a plurality of such elements.

Note that "fluid" as used herein is defined as including both gas and liquid.

The mere fact that certain measures are recited in mutually different dependent claims does not indicate that a combination of these measures cannot be used to advantage.

The invention claimed is:

1. A method of maintaining a condition of a non-leaking structure, the non-leaking structure carrying a fluid, the non-leaking structure provided with a jacket covering at least a portion of the structure, the jacket forming a pocket between the jacket and the structure, the pocket having an inlet and an outlet, the pocket acquiring a fluid therein, the method comprising:
   injecting a drive fluid into the pocket in a flow through the inlet; and
   moving the fluid in the pocket with the flow of injected drive fluid out of the pocket through the outlet, wherein the fluid is a corrosive fluid which has not leaked from the structure and which if not moved out of the pocket is capable of damaging the structure.

2. The method according to claim 1, wherein the is a fluid from condensation and the drive fluid is air.

3. The method according to claim 2, further comprising filtering the air upstream of the pocket to increase dryness of the air.

4. The method according to claim 1, further comprising controlling a temperature of the drive fluid and thereby the temperature in the pocket.

5. The method according to claim 1, wherein the non-leaking structure is a pipe.

6. The method according to claim 1, wherein the non-leaking structure is a fluid separator.

7. The method according to claim 1, further comprising:
   detecting the fluid by use of a detection means downstream of the outlet.

8. An apparatus comprising:
   a structure carrying a fluid;

a jacket covering at least a portion of the structure, forming a pocket between the structure and the jacket, and providing an inlet into the pocket and an outlet from the pocket;

a fluid source for injecting a drive fluid into the pocket;

a first tube connecting the fluid source to the inlet of the pocket for leading the drive fluid into the pocket;

a second tube connected to the outlet of the pocket for leading leaked fluid and the drive fluid out of the pocket;

a first pressure sensor in fluid communication with the first tube for monitoring a first fluid pressure in the first tube;

a second pressure sensor in fluid communication with the second tube for monitoring a second fluid pressure in the second tube;

means configured to determine whether the second fluid pressure is higher than the first fluid pressure and to detect a leak from the structure into the pocket based on the determination; and a detection means for detecting the leaked fluid, the detection means being placed downstream of the pocket, in fluid communication with the pocket via the second tube and configured for detecting the leaked fluid, the apparatus being configured for providing a flow of drive fluid from the fluid source through the pocket for driving a leaked fluid from the pocket to the detection means for the detection means to detect the leaked fluid.

9. The apparatus according to claim 8, further comprising means configured to determine whether the second fluid pressure is lower than the first fluid pressure and detect a leak from the apparatus out of the pocket based on the determination.

10. The apparatus according to claim 8, wherein the jacket comprises a gastight material and/or a thermal-protection material.

11. The apparatus according to claim 8, further comprising a liquid-detection device arranged in the pocket for detecting a presence of a liquid in the pocket.

12. The apparatus according to claim 8, wherein the jacket has hook and loop fastening means for fastening the jacket to the structure.

13. The apparatus according to claim 8, further comprising means for controlling a temperature of the drive fluid and thereby the temperature in the pocket.

14. The apparatus according to claim 8, wherein the jacket comprises material that provides insulation.

15. The apparatus according to claim 8, wherein the structure is not a pipe or pipeline.

16. The apparatus according to claim 8, wherein the jacket covers a portion of a pipeline, said portion comprising a flange or a valve which is susceptible to leak.

17. The apparatus according to claim 8, wherein the detection means comprises a multi-gas detector.

18. A method of using the apparatus according to claim 8 to detect a leakage, the method comprising:

injecting a drive fluid into the pocket in a flow through the inlet;

moving a leaked fluid in the pocket with the flow of injected drive fluid out of the pocket through the outlet;

determining whether the second fluid pressure is higher than the first fluid pressure, and detecting a leak from the structure into the pocket based on the determination; and detecting the leaked fluid by use of the detection means downstream of the outlet.

19. A method of using the apparatus according to claim 8 to detect a leakage, the method comprising:

injecting a drive fluid into the pocket in a flow through the inlet;

moving a leaked fluid in the pocket with the flow of injected drive fluid out of the pocket through the outlet;

comparing the monitored first and second pressures upstream and downstream of the pocket, and by way of said comparison detecting the leakage; and detecting the leaked fluid by use of the detection means downstream of the outlet.

20. A detection system for detecting a leakage, the detection system comprising:

a plurality of jackets each covering at least a portion of a structure carrying a fluid, forming a pocket between the structure and the jacket and providing an inlet into the pocket and an outlet from the pocket;

a fluid source for injecting a drive fluid into each of the pockets;

a plurality of first tubes connecting the fluid source to the inlet of each of the pockets for leading the drive fluid into each of the pockets;

a plurality of second tubes for leading leaked fluid and the drive fluid out of the plurality of pockets;

a plurality of first pressure sensors in fluid communication respectively with the first tubes for monitoring fluid pressures in the first tubes;

a plurality of second pressure sensors in fluid communication respectively with the second tubes for monitoring fluid pressures in the second tubes;

means configured to determine for each pocket, whether fluid pressure in the second tube, downstream of the pocket is higher than fluid pressure in the first tube, upstream of the pocket, and to detect a leak from the structure into the pocket based on the determination; and a number of detection means in fluid communication with the plurality of pockets via the plurality of second tubes and configured for detecting the leaked fluid, the detection system being configured for providing a flow of drive fluid from the fluid source through each of the pockets for driving a leaked fluid from any one of the pockets to at least one of the number of detection means for the detection means to detect the leaked fluid.

21. The detection system according to claim 20, further comprising a plurality of detection means for detecting a leaked fluid from one of the structures and a processor connected to the plurality of detection means, wherein each of the detection means of the plurality of detection means is connected to one pocket or one group of pockets, wherein the processor is configured for identifying into which pocket or group of pockets the leaked fluid has leaked by identifying which of the detection means of the plurality of detection means detects the leaked fluid.

* * * * *